(No Model.)
J. D. THOMAS.
CAR SPRING.
No. 264,371. Patented Sept. 12, 1882.
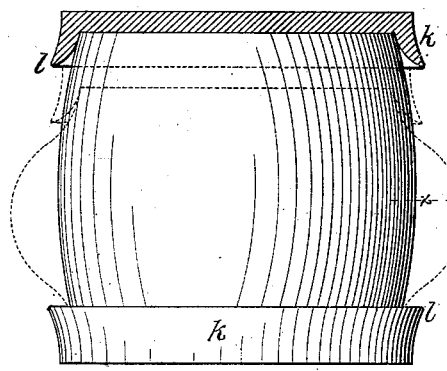
Fig. 1.
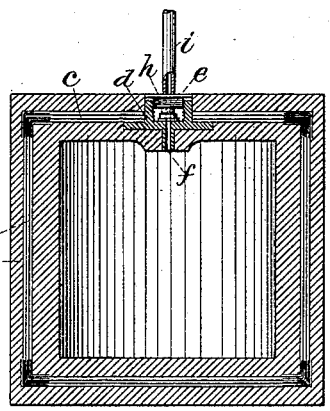
Fig. 2.
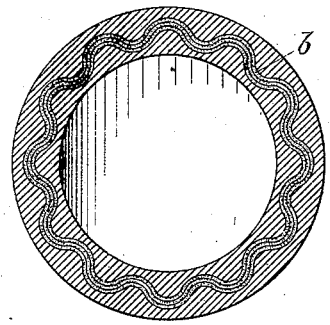
Fig. 3.
Fig. 4.
Witnesses;
E. C. Perkins
Frank A. Meade
Inventor;
Joseph D. Thomas
by Chas. M. Higgins
Attorney.

UNITED STATES PATENT OFFICE.

JOSEPH D. THOMAS, OF NEW YORK, N. Y., ASSIGNOR OF ONE-HALF TO LEONARD F. REQUA, OF SAME PLACE.

CAR-SPRING.

SPECIFICATION forming part of Letters Patent No. 264,371, dated September 12, 1882.

Application filed December 31, 1881. (No model.)

*To all whom it may concern:*

Be it known that I, JOSEPH D. THOMAS, of New York city, have invented certain new and useful Improvements in Rubber and Air Springs for Railway-Cars and other Purposes, of which the following is a specification.

My invention aims to provide an improved form of air-spring for use as buffers in railway-vehicles, or for elastically supporting the bodies of cars or other vehicles upon their trucks or wheels, or for various other purposes where such springs are applicable; and my invention relates to such springs as are formed with a hollow rubber or elastic body charged with a confined mass of air, compressed or normal, whereby the weight and cost are reduced, while the elasticity of the spring is increased.

My present improvements aim to greatly increase the weight-supporting power of the spring without reducing its elasticity or increasing its cost, whereby much smaller springs will perform a greater duty, and it also aims to increase the range of extension or elasticity in the walls of the hollow spring, and at the same time impart great strength thereto.

In one case heretofore a hollow rubber spring has been constructed with a charge of compressed air; but the hollow rubber vessel was formed without any sustaining web or fabric in its elastic walls, and the spring was not only held at both ends, but also inclosed around its sides by a metallic case, and was bound with metal hoops, whereby the rubber vessel had little or no power of expansion laterally, which in this instance would have been injurious to it, but was simply compressed vertically in its case by a plunger above it. Now, in my improvement I construct a hollow rubber spring adapted to be charged with compressed air, and to be held at its opposite ends only and be freely exposed on its sides, and capable of free lateral expansion and contraction under the varying action of the load, whereby a light spring having both great weight-supporting power and great range of elasticity is produced, as hereinafter fully described.

The second feature of my invention consists in embedding within the rubber or elastic walls of the hollow spring a sustaining-web of canvas or other material arranged in a sinuous or fluted form, which allows the spring to expand to a great degree before any appreciable strain is exerted upon the web, as hereinafter fully set forth.

In the annexed drawings, Figure 1 presents a side elevation of my improved spring, represented as held between its socket-plates and as bowed slightly under a weight, or in such form as it would normally assume when quiescent, while the dotted lines represent the flattening and outspreading of the spring under a great weight or sudden jolt of the vehicle in which it might be used. Fig. 2 presents a vertical section of the spring, shown in its quiescent condition, without being under any weight. Fig. 3 is a cross-section on *x x*; and Fig. 4 is a diagram representing the position of the mesh in the sustaining-web, which is embedded in the walls of the spring.

It will be seen on reference to the drawings that, simply described, the spring is a hollow elastic air vessel or cushion. I do not limit myself to any exact form for this hollow elastic vessel or cushion; but I have illustrated the form and proportion that I consider practically the best—that is, I make the spring preferably in a true cylindrical form of square proportion, having an external diameter equal to its extreme height, as shown well by Figs. 2 and 3. The best size for general railway use I find to be about eight inches in both directions—that is, both in diameter and height—and in this size I prefer to make the walls of the spring or cushion both on the sides and on the ends about one inch and a half thick throughout, thus leaving a cylindrical cavity within measuring five inches by five. These walls should of course be made of some strong and flexible or elastic material, and as vulcanized rubber is the general material employed for similar purposes, and the only material that appears now suitable, it is not necessary that I here specify any other material of construction, without, however, limiting myself to that. This spring is made in the usual manner in which other hollow rubber articles are made—viz., with a sustaining web or frame of canvas or other suitable fabric embedded within its rubber walls, as shown at b c in Fig. 1, which of course pervades both the vertical sides and the heads of the cylinder, as illustrated. The edges or ends of the canvas in the sides of the cylinder are joined or interlaced with the edges or ends of that in the heads at the corners or angles of the cylinder, as seen in Fig. 2, thus forming a continuous frame or web within the rubber walls, as will be understood. I prefer to use three layers of canvas cemented closely to each other by thin films of rubber cement, as indicated in Figs. 2 and 3, but more or less may be used. It may now be seen on reference to Fig. 3 that the canvas in the sides of the cylinder is arranged in sinuous folds or flutes or in a scalloped form, which, as will be readily understood, allows the rubber cylinder to expand or distend to a great degree when under the stress of a sudden force, as indicated by dotted lines in Fig. 1, before any tearing strain will be exerted on the canvas, and at the same time the canvas firmly supports the rubber, whether quiescent or under tension. The canvas layers in the heads of the cylinder are laid flat or level, as the heads are of course designed to be practically non-extensible in a radial direction. I also prefer to have the canvas in the sides of the cylinder cut on the bias, as indicated in Fig. 4, which brings the woven mesh diagonal to the circumference of the cylinder. Consequently the mesh possesses a great mobility or power of circumferential extension and vertical contraction, similar to a lazy-tongs, which thus gives the spring great range of extension in the direction shown by dotted lines in Fig. 1, without positively straining the strands or threads of the canvas; but this I do not claim of itself.

In one end of the elastic cylinder, as seen in Fig. 2, is arranged a suitable valve, by which the cavity of the cylinder may be charged with compressed air or gas to any desired pressure, and then closed or sealed to retain the charge. This valve consists of a seat or socket, d, having a broad flange embedded in the rubber of the head, and a neck or nipple, f, which extends inward and opens into the air-cavity. Into the socket is screwed a hollow valve-plug, e, having at its lower end a valve-disk, which is adapted to seat on the base of the socket and cover the mouth of the nipple f, as shown. The valve-plug has a broad flange, h, the top of which may be seized by a pin-wrench to screw the plug to or from its seat, and it also has a central bore, into which is screwed the end of a pipe, i, through which the compressed air may be conveyed. The bore of the plug does not extend through to the end, but opens laterally therefrom into the cavity of the socket d, from whence the air will flow when the valve-plug is raised from its seat, through the nipple f, into the cavity of the spring. The compressed air may thus be forced through the pipe and valve into the cavity of the spring till accumulated to the desired pressure, when the air may be shut off and the plug e screwed down firmly to its seat, after which the air-pipe i may be unscrewed, when the spring is ready for use.

I prefer to charge the springs, when of the dimensions before stated, with air or other gas to a pressure of about thirty pounds to the square inch; but much less than this may be used, although it is not desirable to use much more. This pressure will have little or no tendency to laterally distend the walls of the spring when quiescent, owing to their thickness and strength, and to the fact that the pressure on the ends, tending to longitudinally extend the spring, about balances the lateral pressure on the side, which tends to flatten it, so that hence the spring will retain substantially a cylindrical shape when not under stress. It will thus be seen that the strong internal pressure to which the spring is constantly subjected by reason of its charge of compressed air gives it a great resistant or weight-supporting power over what it would possess if charged simply with atmospheric air, while at the same time its ratio and range of elasticity are precisely the same as it would possess if charged with air only at the atmospheric density. Hence springs of much less size and weight of rubber may be made to perform the same or a much greater duty than heretofore, thereby conducing greatly to cheapness and compactness as well as efficiency, for a hollow rubber spring charged with air or gas, whether atmospheric or compressed, possesses a most constant and permanent quality of elasticity.

When used in supporting bodies of railway-cars upon their trucks the spring may be socketed between two plates, k k, Fig. 1, having broad flat bearing-faces to abut against the flat ends of the cylindrical spring, and with deep flaring rims l l, having nicely rounded edges, which allows the spring to bow outward when under stress, as indicated by dotted lines in Fig. 1, without presenting any sharp or cutting edge to the rubber. One of the socket's plates k is of course affixed to the car-body and the other to the truck, or one to the truck and the other to the axle-body, as will be readily understood, according to the position in which the spring is used. The spring may of course be applied and fixed in various ways, according as it is employed as a "buffer" or "spring," which attachments do not form any essential part of my invention, and need no description here. It will be noted, however, that in my case the hollow rubber vessel or air-spring is held at its opposite ends only, and that its sides are freely exposed. Hence the spring is free to expand or contract laterally under the varying stress of the load and its full range of elasticity is available, whereas heretofore the hollow compressed-air spring has been inclosed around its sides by a metal case, and, furthermore, bound with metal rings to prevent or limit lateral expansion. In the case referred to lateral expansion would be injurious to the rubber spring, as it was formed without a sustaining web or fabric in its walls. Hence when forced to expand or contract vertically its range of elasticity is less, and there is added to the spring a great weight of metal in the compressing-plunger, inclosing cylinder, and binding-rings, which renders the spring much heavier than a solid-rubber spring and with less range of elasticity, whereas the important qualities which I seek for and secure in my spring are greater lightness and greater elasticity and weight-supporting power, which features combine to render my spring a distinct improvement in this line.

Instead of using the form of valve shown for sealing the spring, any other suitable one may be employed; and, if preferred, the valve may be covered over and completely concealed by rubber after the spring is charged.

Instead of a metallic valve, the aperture through which the spring is charged may be sealed with a plug of rubber forced into the same and cemented, if preferred.

What I claim is—

1. A hollow rubber vessel adapted to contain compressed air, in combination with the apertured seat or socket $d$, embedded in the rubber, and a valve for closing the aperture in said socket, substantially as described.

2. A hollow rubber vessel adapted to contain compressed air, in combination with the apertured seat or socket $d$, secured to said vessel, and the valve $e$, secured to a head screwing into the socket, substantially as described.

3. A hollow rubber vessel adapted to contain compressed air, in combination with the screw-threaded socket $d$, having a nipple, $f$, and a broad flange to be embedded in the rubber vessel, and the valve $e$, secured to an apertured plug screwing into the socket, substantially as described.

4. An improved air-spring consisting of a complete hollow vessel of rubber formed with a sustaining web or fabric embedded in its walls, and having its cavity charged with compressed air, and adapted to be held at its opposite ends only and to be exposed on its sides for free lateral expansion or contraction, substantially as herein shown and described.

5. A spring, buffer, or cushion consisting of a hollow vessel having flexible or elastic walls, constructed with a sustaining web or fabric embedded in its walls and arranged in sinuous folds or flutes, substantially as and for the purpose set forth.

6. A hollow elastic spring, of rubber or equivalent material, constructed with a sustaining web or fabric of canvas or equivalent woven material embedded in its walls in sinuous folds or flutes, and with its mesh arranged diagonally or bias to the walls of the spring, whereby a greater mobility is obtained without appreciably straining the fabric, substantially as herein shown and described.

7. A hollow elastic spring having its cavity charged with a confined mass of air and its walls formed of suitable elastic material, with a sustaining web or fabric embedded in its wall, pervading both the sides and ends of the vessel and joined or interlaced at the corners or angles of the vessel, forming a continuous sustaining shell or frame within the elastic walls, substantially as and for the purpose set forth.

JOSEPH D. THOMAS.

Witnesses:
  CHAS. M. HIGGINS,
  FRANK A. MEADE.